United States Patent
Brienza (10) Patent No.: US 8,272,396 B2
(45) Date of Patent: Sep. 25, 2012

(54) OUTDOOR SILLCOCK MOUNTING KIT

(76) Inventor: Gerard J. Brienza, Brighton, CO (US)

( * ) Notice: Subject to any disclaimer, the term of this patent is extended or adjusted under 35 U.S.C. 154(b) by 425 days.

(21) Appl. No.: 12/585,878

(22) Filed: Sep. 28, 2009

(65) Prior Publication Data

US 2010/0078079 A1    Apr. 1, 2010

Related U.S. Application Data

(60) Provisional application No. 61/136,740, filed on Sep. 29, 2008.

(51) Int. Cl.
*F16L 5/00* (2006.01)
(52) U.S. Cl. .................. 137/360; 137/377
(58) Field of Classification Search .................. 137/360, 137/375, 377, 382; 285/46, 64; 4/695
See application file for complete search history.

(56) References Cited

U.S. PATENT DOCUMENTS

| | | | | |
|---|---|---|---|---|
| 1,115,696 A | * | 11/1914 | Linbarger | 285/64 |
| 3,466,064 A | | 9/1969 | Fulton et al. | |
| 3,494,373 A | * | 2/1970 | Horak et al. | 137/217 |
| 4,206,779 A | * | 6/1980 | Sandstrom | 137/360 |
| 4,314,580 A | * | 2/1982 | Steinwand | 137/360 |
| 4,473,244 A | * | 9/1984 | Hill | 285/14 |
| 4,874,189 A | * | 10/1989 | Gardner | 285/39 |
| 5,385,330 A | | 1/1995 | Joseph | |
| 5,603,347 A | * | 2/1997 | Eaton | 137/360 |
| 5,697,393 A | * | 12/1997 | Mirlisena, Sr. | 137/15.02 |
| 6,061,990 A | | 5/2000 | McMahon | |
| 6,065,491 A | | 5/2000 | Rider | |
| 6,502,364 B2 | | 1/2003 | Richardson | |
| 6,668,852 B1 | | 12/2003 | Williamson | |
| 6,752,167 B1 | * | 6/2004 | Stanaland et al. | 137/218 |
| 7,055,863 B1 | | 6/2006 | Commeville et al. | |
| 7,077,156 B1 | * | 7/2006 | Humber et al. | 137/360 |
| 2005/0199296 A1 | | 9/2005 | Dulin | |
| 2006/0201553 A1 | * | 9/2006 | Poskin et al. | 137/360 |
| 2007/0039660 A1 | | 2/2007 | Hickman | |

FOREIGN PATENT DOCUMENTS

| GB | 2 174 125 A | 10/1986 |
|---|---|---|
| JP | 2004-169280 A | 6/2004 |

OTHER PUBLICATIONS

"Chicago Fucets-293-CP", Monster Marketplace, http://www.monstermarketplace.com/Home/Landing2886a262.html, 3 pages printed from Internet on Jun. 1, 2008.
"PerfectSEtt", Seamless Design, http://www.perfectsett.com/, 2 pages printed from Internet on May 15, 2008.

\* cited by examiner

*Primary Examiner* — Stephen M Hepperle
*Assistant Examiner* — Kevin Murphy
(74) *Attorney, Agent, or Firm* — Richard C. Litman (57) ABSTRACT

The outdoor sillcock mounting kit is positioned around a pipe that is connected to a sillcock. The kit is utilized prior to adding finishing material to the outer wall of a home or building. The kit permits adjustments to the pipe and the sillcock when necessary due to a change in the dimensions of the finished material added to the outer wall, especially those outer finished walls that add brick, stucco, and other types of building materials. The kit has three components, two sleeves of the same basic shape and size except one sleeve is longer. The longer sleeve can be utilized with the third component, which is a block-shaped cover. The cover is utilized with rectangular-type finishing material on the outer wall, and fits over the longer sleeve.

7 Claims, 11 Drawing Sheets

OUTDOOR SILLCOCK MOUNTING KIT

CROSS-REFERENCE TO RELATED APPLICATION

This application claims the benefit of U.S. Provisional Patent Application Ser. No. 61/136,740, filed Sep. 29, 2008.

BACKGROUND OF THE INVENTION

1. Field of the Invention

The present invention relates to plumbing devices and, in particular, to an outdoor sillcock mounting kit.

2. Description of the Related Art

In residential and commercial construction, external faucets (such as sillcocks, bibcocks, or hose bibs) are installed on one or more exterior walls to provide access to a water supply from outside the building. With brick exteriors, installation and maintenance of sillcocks and the surrounding brick is difficult. In a typical installation, a sillcock goes through a drilled hole in a bandboard at the plumbing rough stage. A mason then bricks up the outside around the sillcock. Mortar is placed around the sillcock pipe to hold it in place next to the surrounding bricks. On some occasions, brick or wood pieces are used with the mortar to surround the sillcock to help improve the appearance. Laying brick around the sillcock is difficult and sometimes results in physical damage to the sillcock during the bricking process. Additionally, the finished wall dimensions are always a problem. Usually, the sillcock will stick out too far, or not be far enough out and the plumber has to come back to change it. This is a typical problem when mounting the sillcock on an unfinished outside wall, because the finished wall dimensions are just not known. In fact, after bricking around the sillcock, it is common for the sillcock to be insecure or loose such that it wiggles when used.

Repairing or replacing the sillcock at a later date is also difficult. This is especially true when surrounded by brick and mortar or stucco. For example, the plumber may have to pound out the sillcock from inside. This will dislodge the mortar around the sillcock so the plumber can saw off the outside portion and push the rest back through the hole to the inside. At that point, there is a big hole in the mortar and no way to screw a new sillcock into the brick.

Thus, an outdoor sillcock mounting kit solving the aforementioned problems is desired.

SUMMARY OF THE INVENTION

The outdoor sillcock mounting kit is positioned around a pipe that is connected to a sillcock. The kit is utilized prior to adding finishing material to the outer wall of a home or building. The kit permits adjustments to the pipe and the sillcock when necessary due to a change in the dimensions of the finished material added to the outer wall, especially those outer finished walls that add brick, stucco, and other types of building materials. The kit accomplishes this function by using at least one cylinder-shaped sleeve that has a top and a bottom. There is a circular hole extending from the top to the bottom for encompassing the pipe connected to the sillcock. The cylindrical sleeve has at least one tab that extends perpendicularly from the bottom of the sleeve. The tab is for mounting the sleeve to an outer part of an unfinished wall around the pipe connected to the sillcock.

The kit also has a block-shaped cover. The cover is especially for rectangular outer finished walls or finishing material, such as brick. The cover has a top and a bottom and a circular hole extending from the top to the bottom. The cover receives the sleeve through the circular hole and the cover is adjustably slidable over the sleeve.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
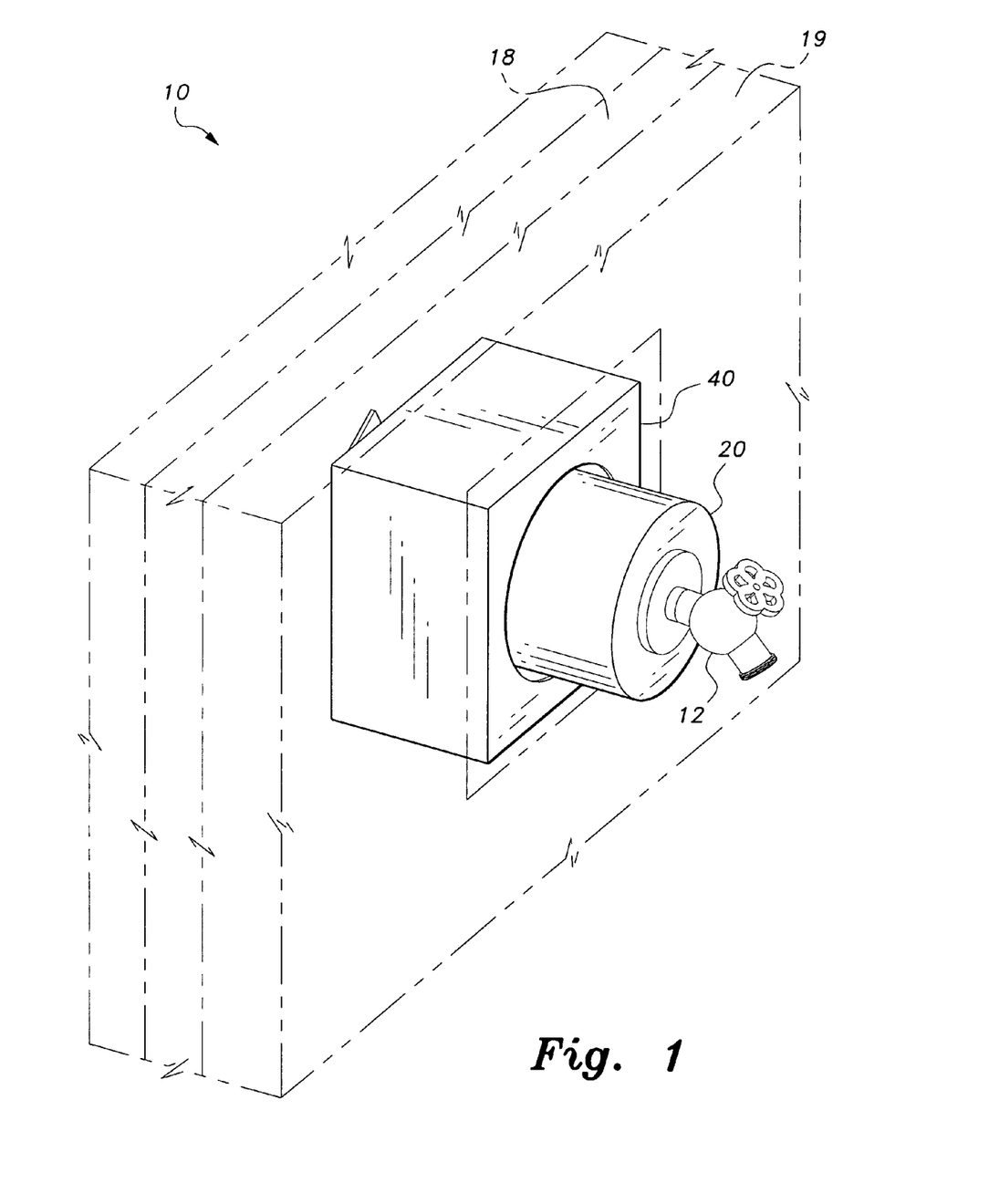
FIG. 1 is an environmental, perspective view of an outdoor sillcock mounting kit according to the present invention.

The present invention, as shown in FIG. 1, relates to a mounting kit for sillcocks, such as those types of sillcocks, hose faucets, or bibcocks mounted on an unfinished outside wall of a home or building under construction. The present invention is generally indicated by the number 10 and is shown assembled with a sillcock 12. The kit 10 has three components, a first or long sleeve 20, a block cover 40, and a second or short sleeve 50 that will be discussed with reference to FIGS. 8-10. In most applications, the first sleeve 20 and the block cover 40 are used. However, in some applications, just the first sleeve 20 or second sleeve 50 is utilized without the block cover 40.

As shown in FIG. 1, the kit 10 permits the sillcock 12 to be mounted during construction without having to worry about the dimensions of a finished material added to an outer wall. The kit 10 is for mounting around the sillcock 12 without the finished material on the outer exterior wall. This finished material can be wood, brick, stucco, or other siding type material. The kit 10 allows the sillcock 12 to be mounted during construction and, once the finished material is placed on the outer wall around the kit 10, the sillcock 12 can be adjusted without destroying the finished material on the outer wall or the sillcock 12.

The kit 10 is designed for mounting in a rough wall 18 during construction. One component part of the kit 10 is a first sleeve-like member 20 for attachment to the rough wall 18 and encompassing the sillcock 12. A second component of the kit is a square mounting member or block cover 40 adapted to be positioned within and extending through the wall 18 and being adjustable to fit the finished wall 19, such as brick or other square type finished material.

Figure 2:
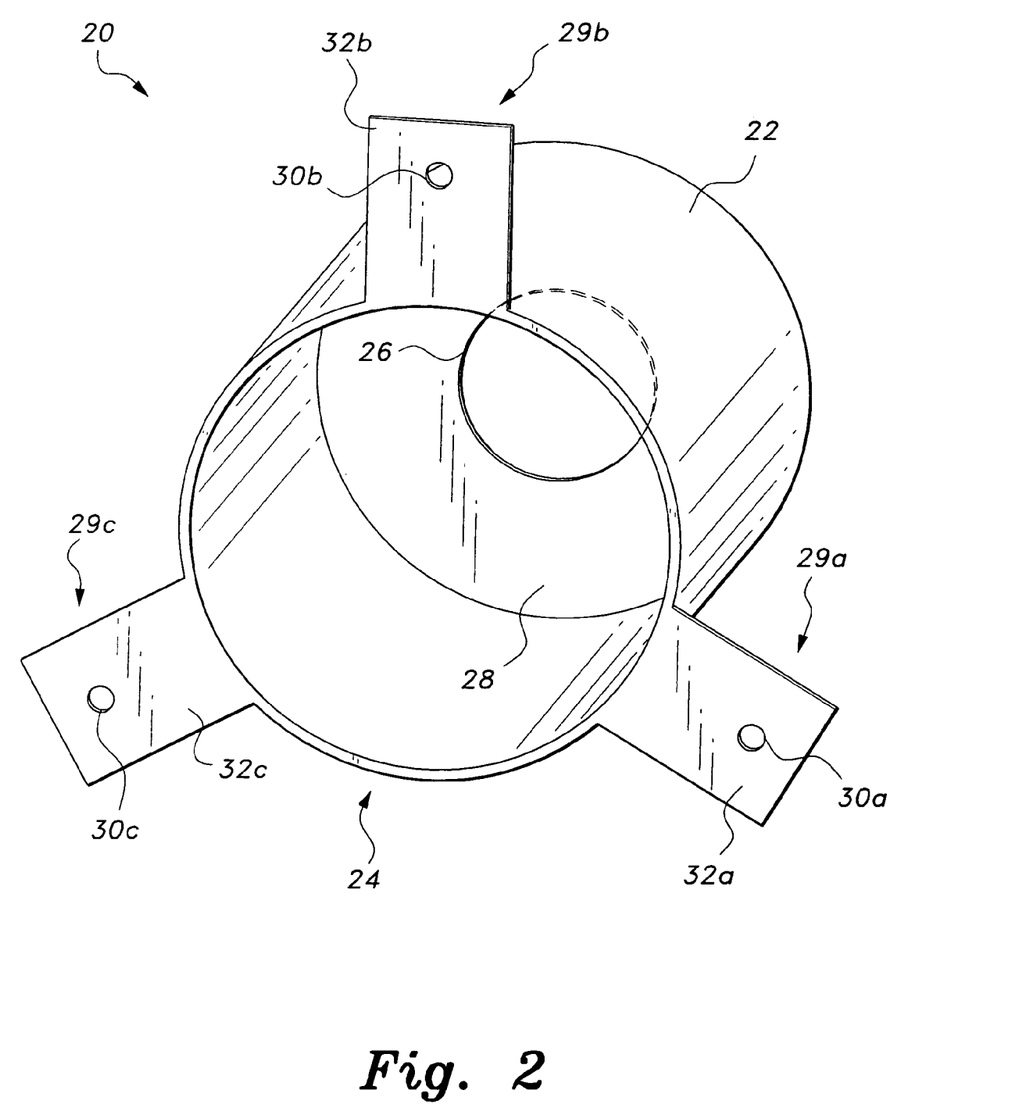
FIG. 2 is a rear perspective view of a long sleeve for the outdoor sillcock mounting kit according to the present invention.

FIG. 2 illustrates the first sleeve 20. The sleeve 20 has a cylinder-shaped body 22 with a circular opened bottom 24 and a hole 26 at a top 28 of the cylinder-shaped body 22. Extending perpendicularly from the cylinder-shaped body 22 are three tabs 29a, 29b, 29c. The tabs 22a, 22b, 22c are for mounting the first sleeve 20 to the outer part of the unfinished wall around a pipe 14 connected to the sillcock 12. Of course, the three tabs 29a, 29b, 29c could be one complete circular flange extending perpendicularly from the cylinder-shaped body 22 and completely around the cylinder-shaped body 22 to provide added contact points when mounting the first sleeve 20 to the exterior of the outside wall. Thus, with the three tabs 29a, 29b, 29c or a single flange, the first sleeve 20 would be mounted on an exterior wall and the pipe would extend through the opened bottom 24 and out the hole 26 in the top 28 of the first sleeve 20.

The tabs 29a, 29b, 29c are rectangular in shape and each have a mounting hole numbered 30a, 30b, 30c, respectively, in a flat rectangular shaped area 32a, 32b, 32c. The tabs 29a, 29b, 29c are equally spaced around the circular opened bottom 24 of the first sleeve 20.

Figure 3:
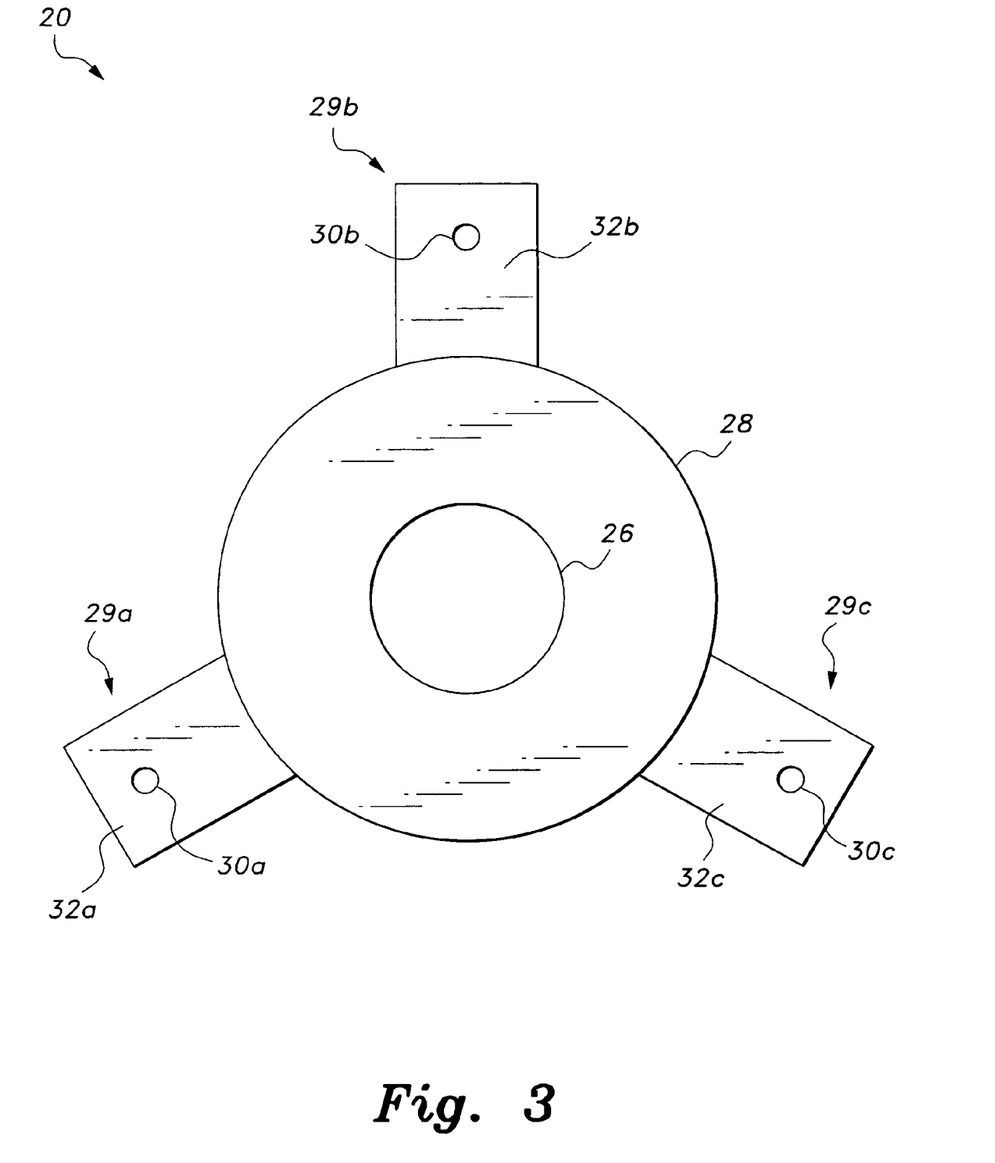
FIG. 3 is a top view of the sleeve of FIG. 2.
Figure 4:
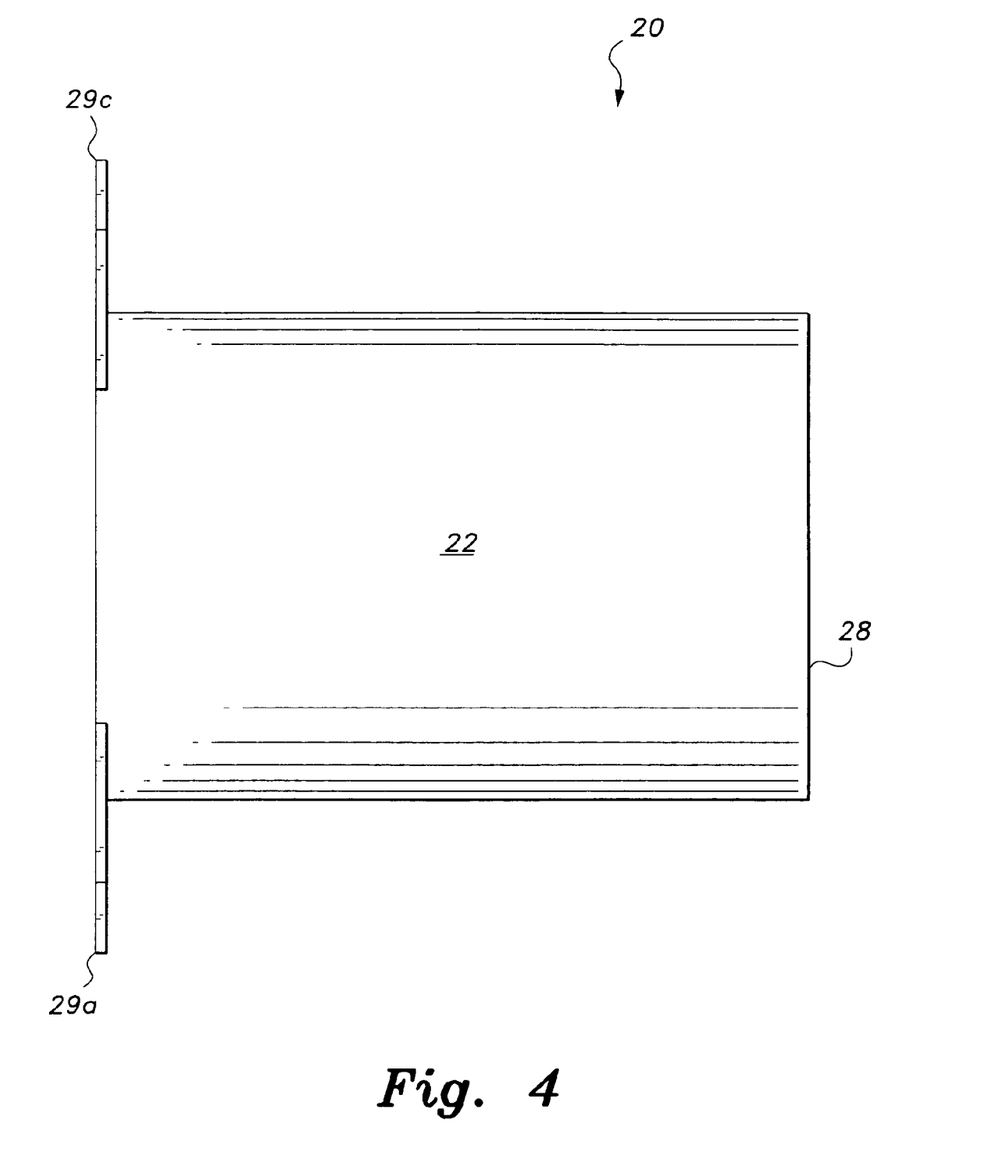
FIG. 4 is a side view of the sleeve of FIG. 2.

With respect to FIGS. 3 and 4, the hole 26 is 1.375 inches in diameter. The top 28 is 3.5 inches in diameter with the hole 26 being centered on the top 28. The tabs 29a, 29b, 29c are 1.25 inches long by 1.0 inches wide. The mounting holes 30a, 30b, 30c are 0.375 inches in diameter. The cylinder-shaped body 22 is five inches in height.

Figure 5:
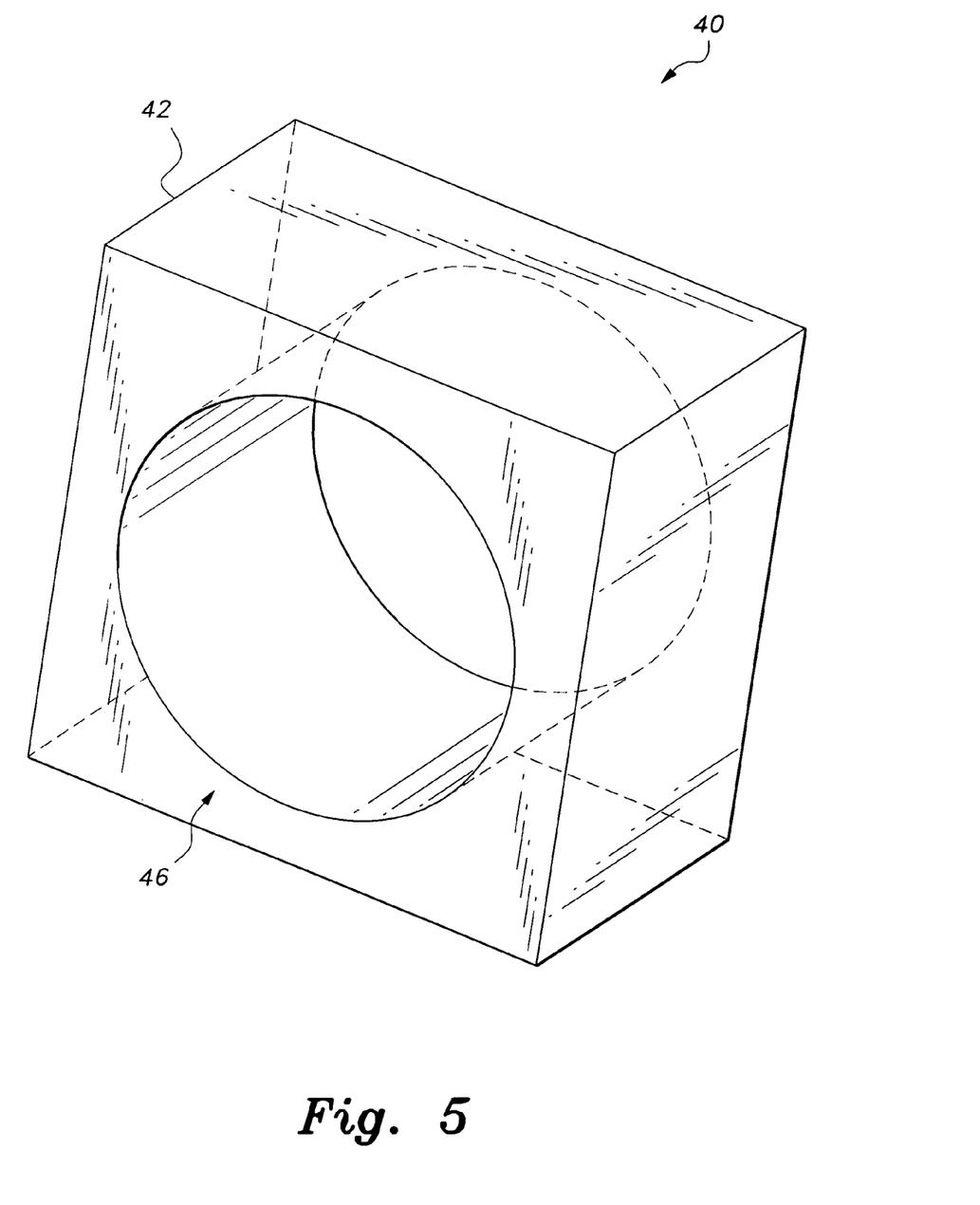
FIG. 5 is a rear perspective view of a block cover for the outdoor sillcock mounting kit according to the present invention.
Figure 6:
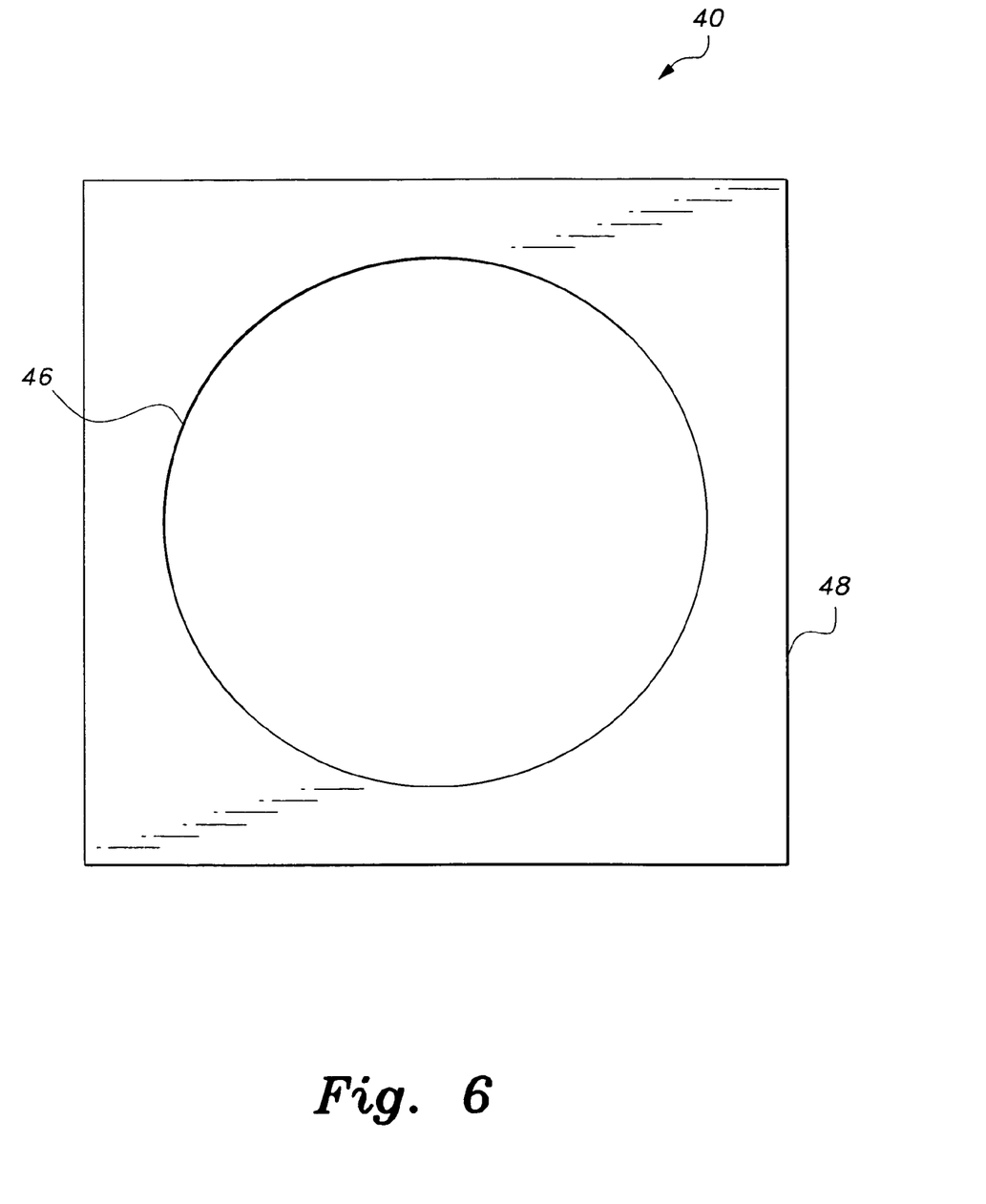
FIG. 6 is a top view of the block cover of FIG. 5.

In FIGS. 5 and 6, the block cover 40 is shown. The block cover 40 has a rectangular-shaped body 42 with a squared bottom 44. The squared bottom 44 is approximately five inches by five inches and the height of the rectangular-shaped body 42 is three inches. There is a circular hole 46 with a diameter of 3.6875 inches that extends from the squared bottom 44 to a rectangular top 48 of the block cover 40. The circular hole 46 receives and surrounds a substantial portion of the first sleeve 20 when mounting the block cover 40 on to the first sleeve 20. The block cover 40 is used especially with a brick-type or a stucco-type outer wall on a home or a building. In other words, the block-cover 40 can be used with any rectangular-type outer finished wall when using the first sleeve 20.

An O-ring or rubber type gasket could be used to slide over the first sleeve 20 prior to placing the block cover 40 on the first sleeve 20 to provide a snug fit. Additionally, an adhesive could be applied around the inner part of the block cover 40 or the outer cylinder wall 22 of the first sleeve 20. Later, silicone, or mortar could be used to finish the wall around the kit 10 and the sillcock 12.

Figure 7:
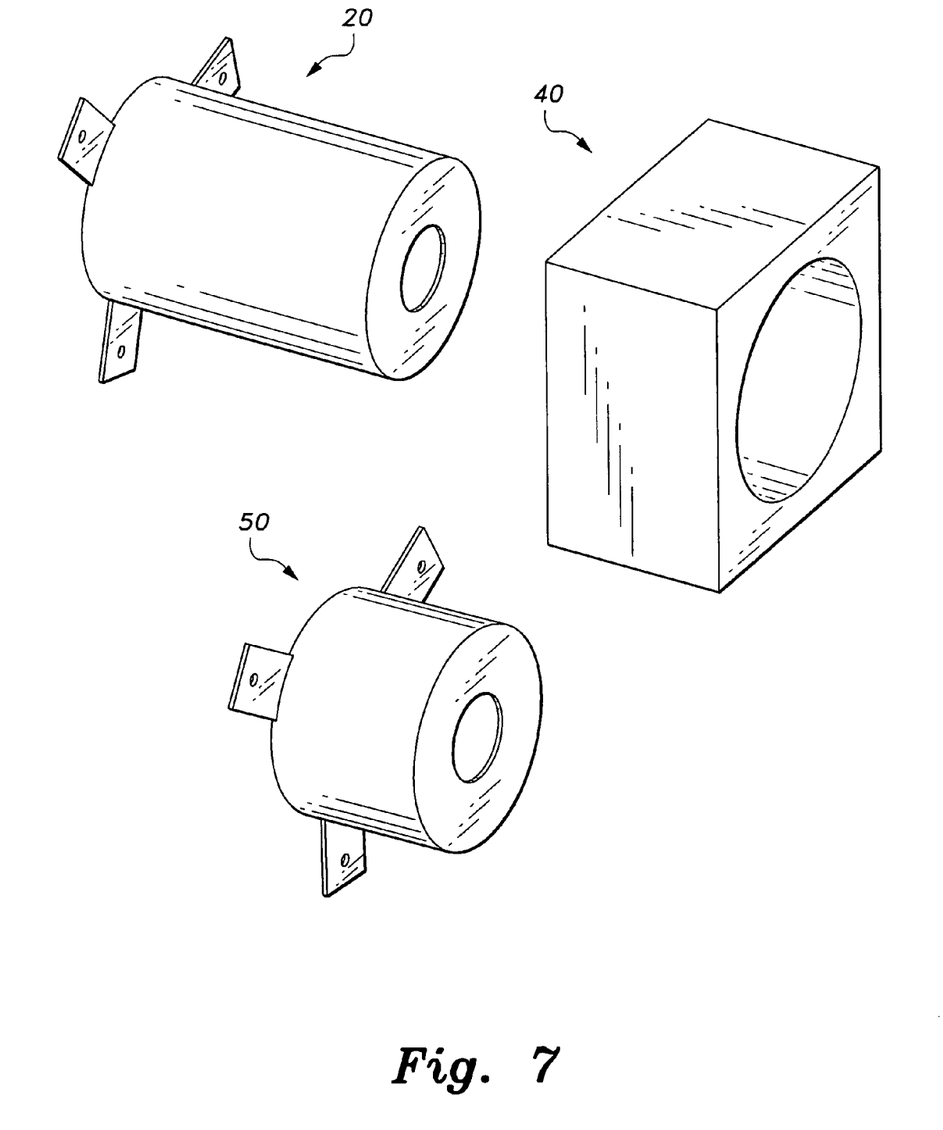
FIG. 7 is a perspective view of an outdoor sillcock mounting kit according to the present invention, showing the components thereof.

FIG. 7 shows the outside sillcock mounting kit 10 with its three components, the first sleeve 20, the block cover 40, and the second sleeve 50. The second sleeve 50 will be described with reference to FIGS. 8 and 9.

Figure 8:
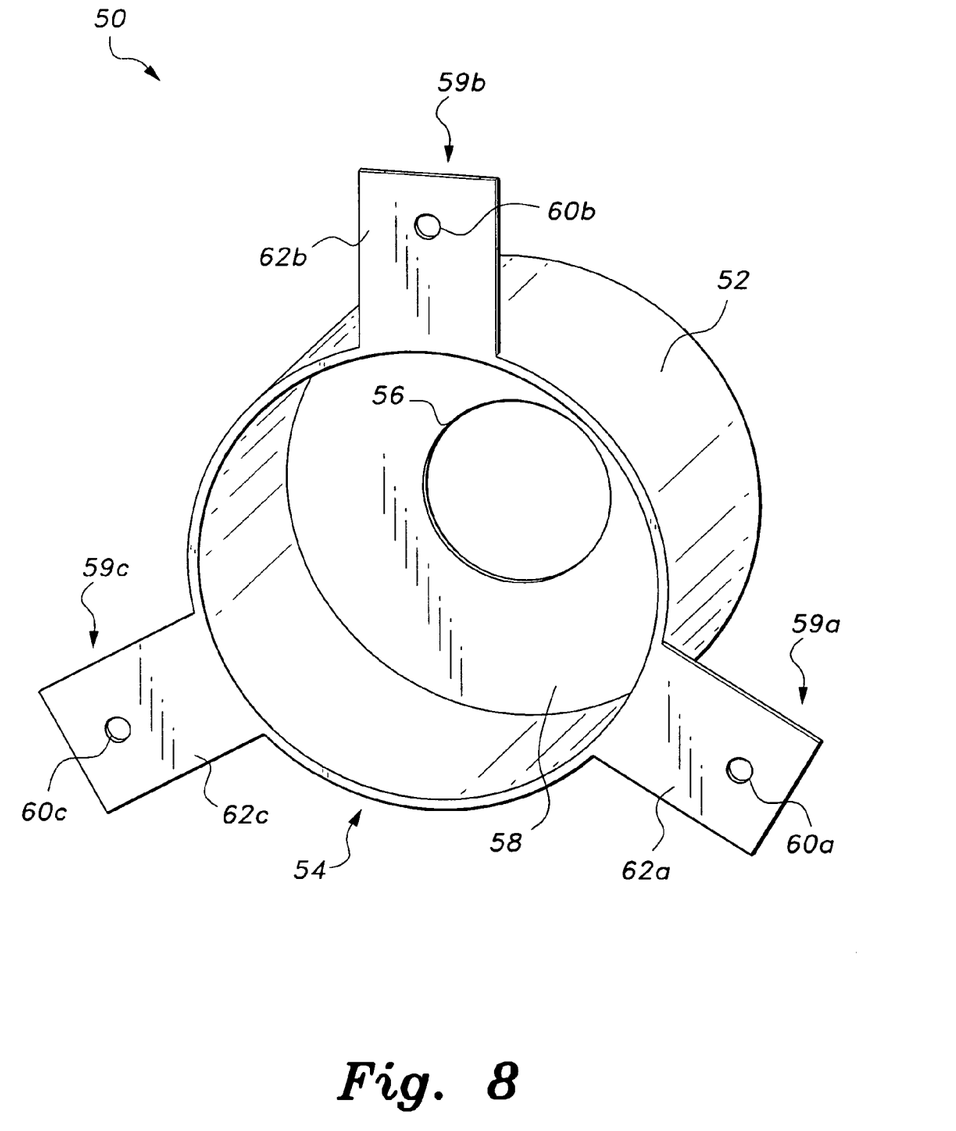
FIG. 8 is a rear perspective view of a short sleeve for the outdoor sillcock mounting kit according to the present invention.
Figure 9:
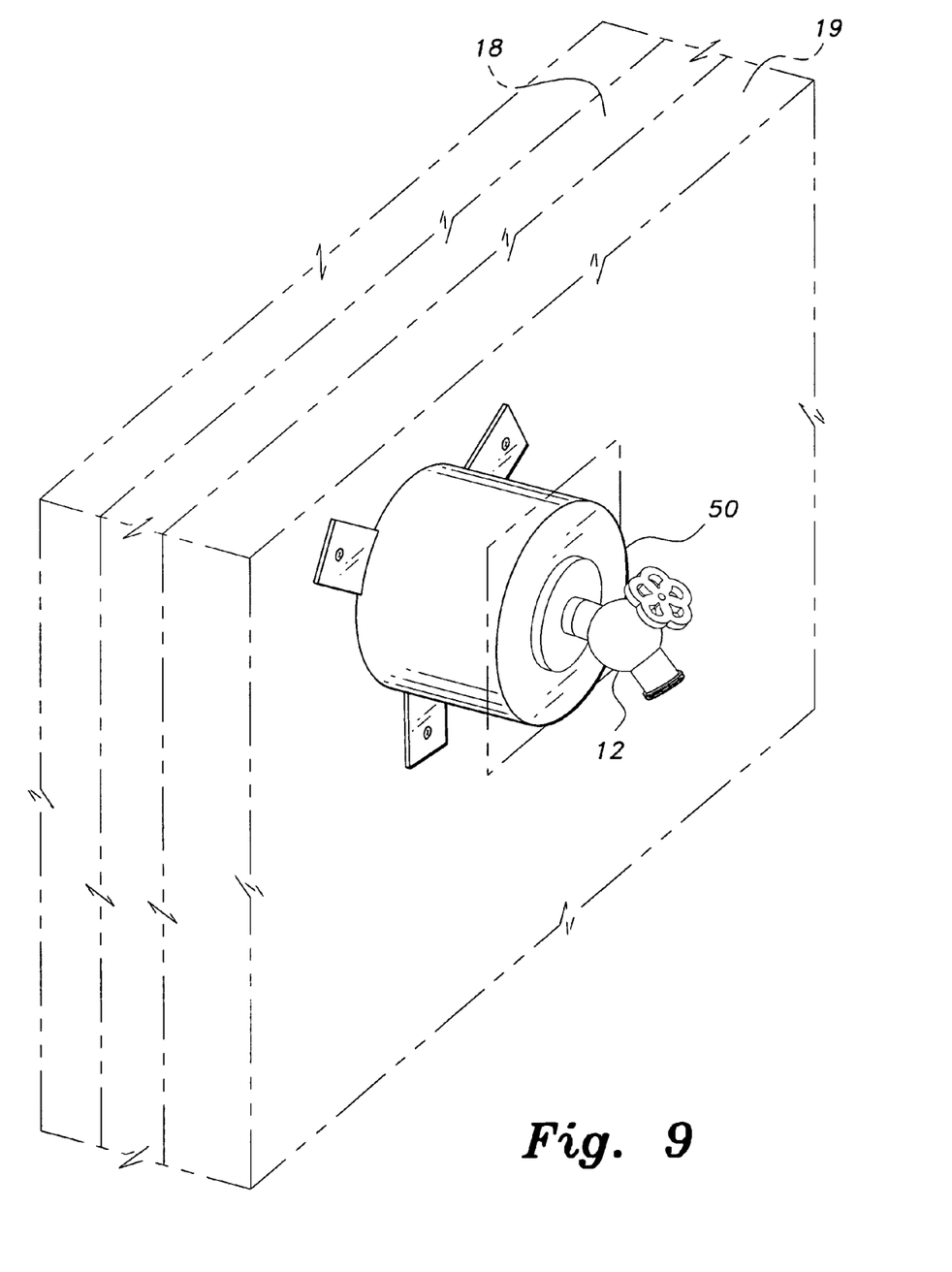
FIG. 9 is an environmental perspective view of the sleeve of FIG. 8, showing a representative installation with the block cover omitted.

With respect to FIGS. 8 and 9, the second sleeve 50 is shown. This sleeve 50 is for when the clearance between the finishing material 19 on the outside wall and the sillcock 12 is less than two inches. In this case, the block cover 40 is not necessary and would not be utilized. The second sleeve 50 is used and it has a cylinder-shaped body 52 with a circular opened bottom 54 and a circular hole 56 in a circular top 58 of the cylinder-shaped body 52.

Extending perpendicularly from the cylinder-shaped body 52 are three tabs 59a, 59b, 59c. The tabs 59a, 59b, 59c are for mounting the second sleeve 50 to an outer part of an unfinished wall around the pipe 14 for connecting to the sillcock 12. Of course, the three tabs 59a, 59b, 59c could be one complete flange surrounding and extending perpendicularly from the cylinder-shaped body 52 to provide added contact points when mounting the second sleeve 50. Thus, with the three tabs 59a, 59b, 59c or a single flange the second sleeve 50 would be mounted on an exterior wall 18 and the pipe, not shown, attached to the sillcock 12 would extend through the opened bottom 54 and out the hole 56 in the top 58 of the second sleeve 50.

The tabs 59a, 59b, 59c are rectangular in shape and each have a mounting hole, numbered 60a, 60b, 60c respectively, in a flat rectangular shaped area 62a, 62b, 62c. The tabs 59a, 59b, 59c are equally spaced around the circular opened bottom 54 of the second sleeve 50 provide a contact point for the second sleeve 50 to the exterior wall 18.

With respect to FIGS. 8 and 9, the hole 56 is 1.375 inches in diameter. The top 58 is 3.5 inches in diameter with the hole 56 being centered on the top 58. The tabs 59a, 59b, 59c are 1.25 inches long by 1.0 inches wide. The mounting holes 60a, 60b, 60c are 0.375 inches in diameter. The cylinder-shaped body 52 is 2.5 inches in height. The second sleeve 50 has the same dimensions as that of the first sleeve 20, except the difference of 2.5 inches in the height of the two sleeves 20 and 50. The second sleeve 50 is used in those types of exterior walls where the wall 19 is not brick, because the second sleeve 50 is shorter than the sleeve 20 and shorter than the block cover 40.

Figure 10:
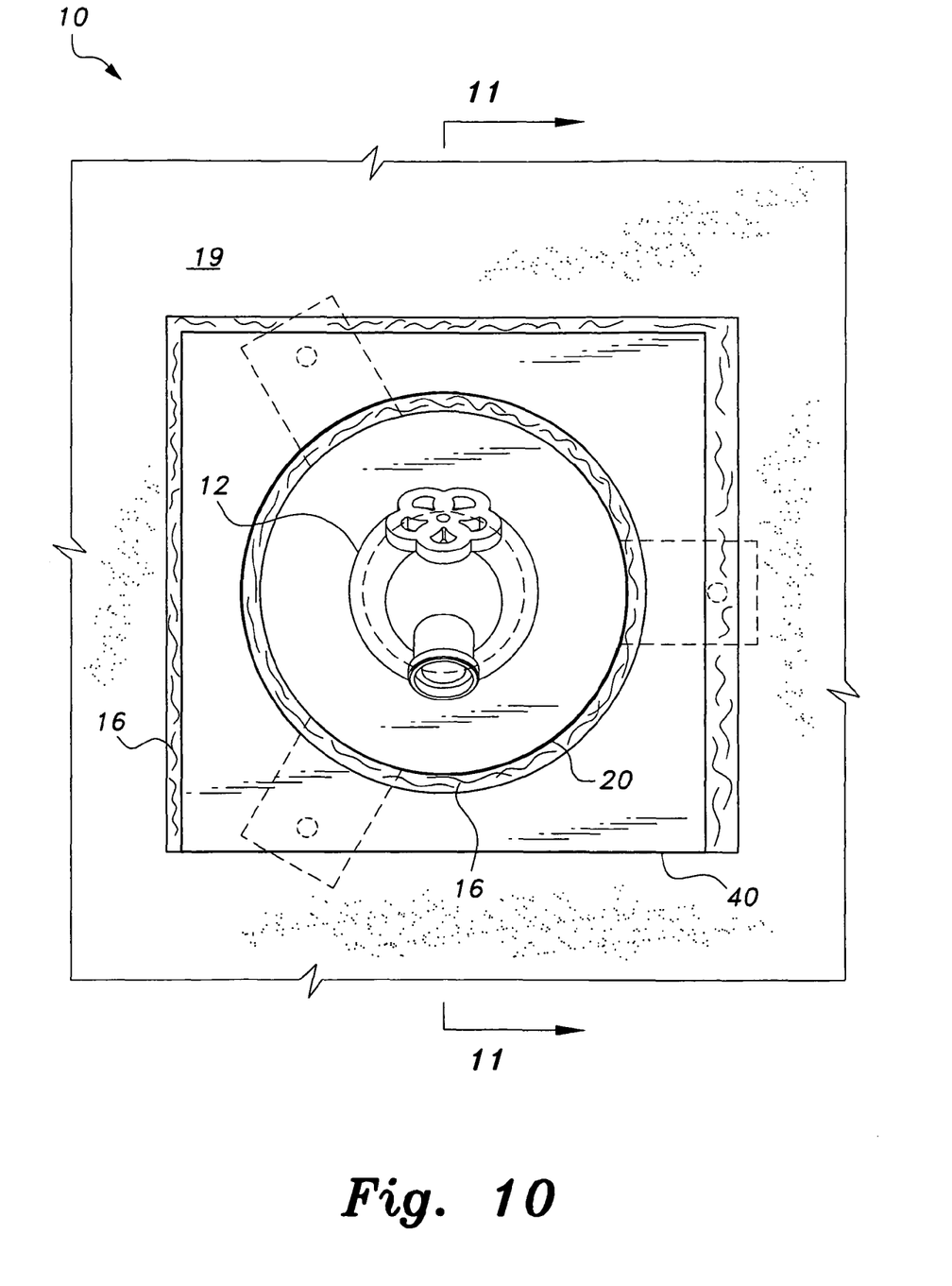
FIG. 10 is an environmental front view of the outdoor sillcock mounting kit according to the present invention, showing a representative installation.
Figure 11:
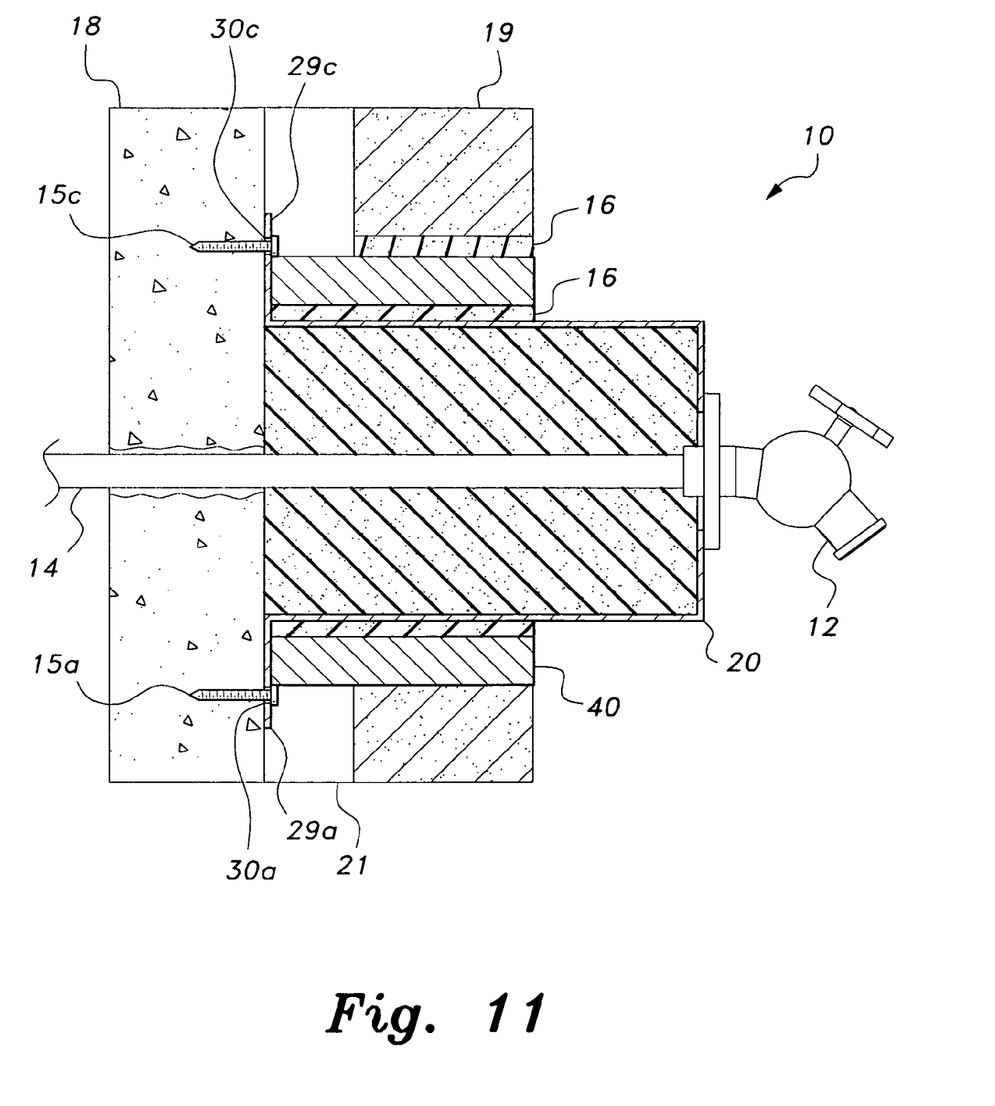
FIG. 11 is a section view taken along lines 11-11 of FIG. 10.

With reference to FIGS. 10 and 11, the first sleeve 20 would be mounted in the rough wall around a pipe 14 of the sillcock 12. The mounting tabs 29a, 29b, 29c are used to secure the first sleeve 20 by way of screws 15a, 15b, 15c through holes 30a, 30b, 30c. The block cover 40 would fit over first sleeve 20 and would be adjusted to fit a brick-type finished wall 19. Of course, depending on the size of the brick or the amount of mortar 21, the block cover 40 can be adjusted to align with the brick wall 19. There may be about a quarter of an inch of the first sleeve 20 extending beyond the finished wall 19, but since the first sleeve 20 is round, water or other outside elements just run off. Additionally, the sleeve 20 can be filled with pipe insulation and then caulked to prevent freezing.

The kit 10 also be able used for other wall penetrations such as gas lines, sprinkler lines, etc.

It is to be understood that the present invention is not limited to the embodiments described above, but encompasses any and all embodiments within the scope of the following claims.

I claim:

1. An outdoor sillcock mounting kit, comprising:
   at least one cylindrical sleeve having a top and a bottom, wherein the top defines a top surface including a hole therethrough and the bottom defines an open bottom terminating in a bottom edge, the hole and open bottom defining a circular hole extending continuously therethrough from the top to the bottom edge, and at least one tab extending perpendicularly from the bottom edge of the sleeve adapted for mounting the sleeve to an outer part of an unfinished wall around a pipe connected to a sillcock; and
   a block-shaped cover having a top, a bottom, and a circular hole extending from the top to the bottom, the block-shaped cover adjustably freely sliding over substantially the entire length of the at least one sleeve when positioned around the pipe connected to the sillcock for use with a rectangular outer finished wall.

2. The outdoor sillcock mounting kit according to claim 1, wherein the at least one cylindrical sleeve comprises:

a first substantially tall cylindrical sleeve for a relatively thick finished wall; and a second substantially short cylindrical sleeve for a relatively thin finished wall.

3. The outdoor sillcock mounting kit according to claim 2, wherein three tabs are equidistantly spaced around the bottom edge of the cylinder body, each of the tabs having a mounting hole formed therein.

4. The outdoor sillcock mounting kit according to claim 3, wherein the first cylindrical sleeve is about five inches in height.

5. The outdoor sillcock mounting kit according to claim 2, wherein the second cylindrical sleeve comprises:

a cylinder body having a hole at the top and an open bottom, the hole and open bottom defining the circular hole, the circular hole adapted to permit passage of the pipe connected to the sillcock; and three tabs equidistantly spaced around the bottom of the cylinder body, each of the tabs having a mounting hole formed therein.

6. The outdoor sillcock mounting kit according to claim 5, wherein the second cylindrical sleeve is about 2.5 inches in height.

7. The outdoor sillcock mounting kit according to claim 1, wherein the block-shaped cover comprises a rectangular body with the circular hole centrally formed therein.

\* \* \* \* \*